United States Patent Office 3,836,487
Patented Sept. 17, 1974

3,836,487
HIGH IMPACT RIGID SELF-SKINNED POLY-URETHANE FOAM AND METHOD
Russell P. Carter, Jr., Stow, Ohio, assignor to The Goodyear Tire & Rubber Company, Akron, Ohio
No Drawing. Continuation-in-part of abandoned application Ser. No. 761,808, Sept. 23, 1968. This application May 24, 1971, Ser. No. 146,426
Int. Cl. C08g 22/46
U.S. Cl. 260—2.5 AK    7 Claims

ABSTRACT OF THE DISCLOSURE

This invention provides a method of forming a rigid polyurethane foam having a density of about 20 to 50 pounds per cubic foot and a Gardner impact of at least 1 inch pounds by reacting a mixture of a polyether glycol of about 700 to 1500 molecular weight selected from the class of polypropylene ether glycol, polypropylene ethylene ether glycol, polytetramethylene ether glycol and an organic polyisocyanate having an average NCO functionality of about 2.5 to 2.8, nut flour and a blowing agent.

---

This application is a continuation-in-part of application Ser. No. 761,808, filed Sept. 23, 1968 now abandoned.

This invention relates to a method of making a rigid polyurethane foam which is relatively tough but not brittle or friable, and preferably has a density of about 50 to 20 pounds per cubic foot and a Gardner impact of at least 1 and preferably 2.

Heretofore the rigid polyurethane foams have tended to be tough and friable and in many respects unsuited for use where the foam must be applied by an application such as nailing or screwing the foam piece to itself or other articles or the foam is subjected to impact and/or compression.

An object of this invention is to provide a method for making rigid polyurethane foam which is tough but non-friable.

The objects of this invention and other advantages can be achieved by reacting a polyether glycol of about 700 to about 1500 and preferably 900 to 1500 molecular weight having incorporated therein about 10 to about 150 parts and preferably about 50 to 75 parts of a suitable wood flour with an organic polyisocyanate that has a functionality greater than 2 with a suitable amount of a monomeric polyol, together with a foaming agent. It should be readily apparent that suitable polyurethane catalysts may be used to advantage to control the rate of reaction of the isocyanate with the polyether or the monomeric polyols and also to regulate the rate of foaming and curing of the resulting product.

Representative examples of the polyether diols that can be utilized are polypropylene ether diol, polybutylene ether diol and a mixed polypropylene-ethylene ether diol, or mixtures of these diols.

The monomeric polyols that can be used in making the rigid polyurethane foams of this invention are those having a molecular weight less than about 500 and preferably less than about 300 such as the following representative members: trimethylol propane, trimethylol ethane, glycerine, hexane triol and N,N,N',N' - tetrakis-(2-hydroxylpropyl) ethylene diamine. Since trimethylol propane is a solid it is advantageous to use it in conjunction with sufficient liquid polyol such as glycerine to give a pumpable mixture and thereby facilitate the formation of the reaction mixture.

The wood flours useful in this invention are the nutshell flours obtained by grinding up walnut and pecan shells and the shells of related nuts until they obtain a fineness of a powder and preferably sufficiently fine to pass through a 100-mesh U.S. Standard Screen. These wood flours are preferably used in the amount of about 75 parts to about 125 parts per hundred parts of the polyether glycol.

The organic polyisocyanates useful in making the rigid foams of this invention are those which contain more than 2 and preferably about an average of 2.5 to 2.8 or more isocyanate groups per molecule of the mixture. A broad class of organic polyisocyanates suitable for use in this invention are those prepared from an aldehyde amine reaction product which has been phosgenated to give a polyisocyanate or mixtures of polyisocyanates. The preparation of isocyanates of this type is illustrated in U.S. Pat. No. 2,683,730. It should be appreciated that the methylene di(phenylisocyanate) content of the mixture can range from about 85 to about 10 percent by weight. Also, organic polyisocyanates such as tri(phenylene isocyanato) methane may be used. Normally, the amount of organic polyisocyanate used will be stoichiometrically calculated to give an NCO/OH ratio of from about 0.9 to 1.15. A 1:1.1 ratio is preferred based on the polyether glycol used. The blowing agent may be water and can be used in about 0 to 5 parts per 100 parts of polyether glycol provided an auxiliary blowing agent is present, at least when the water content is 0 percent. Also, the low boiling auxiliary blowing agents such as methylene chloride or the fluorinated hydrocarbons, for instance, dichloro difluoroethane can be utilized to obtain a rigid foam having the desired characteristics in conjunction with the water.

Representative examples of the many embodiments of this invention are set forth in the examples below where all parts are by weight unless otherwise designated.

EXAMPLE 1

A rigid polyurethane foam was prepared by preblending 22 parts of a polypropylene ether glycol of 1000 molecular weight, 3 parts of N,N,N',N'-tetrakis-2(-hydroxylpropyl) ethylene diamine, 1.5 parts glycerine, 1.5 parts trimethylol propane and 20 parts of walnut sheel flour, 0.017 parts of dibutyl tin dilaurate, 0.1 parts dimethyl amino-2-methyl-1-propanol and 0.2 parts of water. These ingredients were intimately mixed to give a component mixture A, then this component mixture A was blended and thoroughly mixed with 22 parts of a commercial organic polyisocyanate mixture having an average NCO value of about 2.8 and made by phosgenation of an acid rearranged product of the reaction product of formaldehyde and aniline. The mixture began to cream in about 30 seconds and the foaming was completed and set in two minutes. The resulting foam was allowed to stand for 10 to 12 hours at room temperature to attain a complete cure. This foam was hard and tough and could be nailed to wood in the normal manner to attach the foam to the structural material without the foam crushing or the nail pulling out.

EXAMPLE 2

To illustrate the effect of variation in density on impact resistance of the foam, foams were made using the recipe shown in Table 1 by dispersing all the ingredients in the polypropylene ether glycol and then adding a commercial organic polyisocyanate mixture, available under the trade name "Mondur MR" to effect the formation of the foam. The resulting foam was poured into a suitable mold about 6 x 6 x ⅞ inches and allowed to foam and cure by standing at room temperature for three days. The foams made using the recipes of Table 1 were then subjected to impact and deflection load tests. The results of these tests are recorded in Table 2 along with the density of the resulting foam:

TABLE 1.—FORMULATIONS FOR DENSITY VARIATIONS

| R33X1001 | −25 | −26 | −27 |
|---|---|---|---|
| Polypropylene ether glycol molecular weight 1,000 | 22 | 22 | 22 |
| Quadrol [1] | 3 | 3 | 3 |
| Walnut shell flour | 20 | 20 | 20 |
| Water | .066 | .33 | .66 |
| Dibutyl tin dilaurate | .022 | .022 | .022 |
| DMAMP [2] | .048 | .048 | .048 |
| Mondur MR [3] | 16 | 16 | 16 |

[1] Quadrol is N,N,N',N'-tetrakis-(2-hydroxyl propyl) ethylene diamine.
[2] DMAMP is the abbreviation for dimethyl amino-2-methyl-1-propanol.
[3] Mondur MR is a mixture of organic polyisocyanate having an average NCO content of about 2.7–2.8 supplied by Mobay Chemical Company of the polyaryl methane type.

TABLE 2.—EFFECT OF DENSITY ON STIFFNESS AND IMPACT

| Compound number | Density (lbs./cu.ft.) | Impact First damage (in.-lbs.) | Impact Diameter cavity (inches) | ¼″ deflection load (grams) |
|---|---|---|---|---|
| R33X1001-25 | 42.7 | 30 | 0 | 1,937 |
| R33X1001-26 | 30.3 | 30 | 0 | 795 |
| R33X1001-27 | 23.2 | 2 | .575 | 561 |

From the density data it will be noted that as the density approaches about 20 pounds per cubic foot the impact resistance is no better than a door having a Lauan Mahogany Plywood facing which when subjected to the impact and deflection load tests was observed to have suffered damage at an impact of less than one inch pound with the diameter of the impact cavity at 30 inch pounds impact being 0.380 inches. Thus, these foams had impact resistance substantially better than those found in Lauan Mahogany Plywood faced foamed cored doors.

EXAMPLE 3

To show the effect of the use of additional crosslinking materials on the impact resistance a series of foams were made using the formulations shown in Table 3 where all the ingredients were premixed except the Mondur MR which was added at the time the foaming was desired. The cured foam samples made using the formulations of Table 3 were then subjected to impact and deflection load tests. The results of these tests are recorded in Table 4.

TABLE 3.—FORMULATIONS FOR CROSSLINK DENSITY VARIATIONS

| Recipe R33X1001 | −28 | −29 | −30 | −31 |
|---|---|---|---|---|
| Resin 1010 [a] | 22 | 22 | 22 | 22 |
| Quadrol | 3 | 3 | 3 | 3 |
| Glycerine | | 1 | 2 | 3 |
| Walnut shell flour | 20 | 20 | 20 | 20 |
| Water | .66 | .66 | .66 | .33 |
| DMAMP | .048 | .048 | .048 | .048 |
| Dibutyl tin dilaurate | .022 | .022 | .022 | .022 |
| Mondur MR | 14 | 18 | 24 | 28 |

[a] Resin 1010 is a polypropylene ether glycol of 1,000 molecular weight.

TABLE 4.—EFFECT OF CROSSLINKING ON IMPACT AND STIFFNESS

| Compound number | Density (lbs./cu.ft.) | Impact First damage (in.-lbs.) | Impact Diameter cavity (inches) | ¼″ deflection load (grams) |
|---|---|---|---|---|
| R33X1001-28 | 22.1 | 8 | .475 | 44 |
| R33X1001-29 | 18.9 | 3 | .435 | 1,084 |
| R33X1001-30 | 19.5 | 5 | .503 | 1,833 |
| R33X1001-31 | 22.5 | 5 | .410 | 2,117 |

It can be seen when Tables 3 and 4 are compared that the use of crosslinking agents has materially effected the stiffness of the foam but has not changed the density thereof.

EXAMPLE 4

Another series of foams were made using the formulations of Table 5 and these foams were likewise submitted to impact and deflection load testing and the results thereof are recorded in Table 6:

TABLE 5.—FORMULATIONS FOR THE EFFECT OF DENSITY VARIATIONS FOR CROSSLINKING MATERIALS

| R33X1001 | −47 | −48 | −49 | −50 |
|---|---|---|---|---|
| Resin 1010 | 22 | 22 | 22 | 22 |
| Quadrol | 3 | 3 | 3 | 3 |
| Glycerine | 2 | 2 | 2 | 2 |
| Walnut shell flour | 20 | 20 | 20 | 20 |
| Water | .132 | .198 | .33 | 0 |
| Dibutyl tin dilaurate | .022 | .022 | .022 | .022 |
| DMAMP | .048 | .048 | .048 | .048 |
| Mondur MR | 24 | 24 | 24 | 24 |

TABLE 6.—EFFECT OF DENSITY VS IMPACT AND STIFFNESS FOR CROSSLINKED MATERIALS

| Compound number | Density (lbs./cu.ft.) | Impact First damage (in.-lbs.) | Impact Diameter cavity (inches) | ¼″ deflection load (grams) |
|---|---|---|---|---|
| R33X1001-50 | 48.7 | 11 | .215 | 9,142 |
| R33X1001-47 | 41.8 | 10 | .250 | 8,037 |
| R33X1001-48 | 40 | 10 | .275 | 7,002 |
| R33X1001-49 | 28 | 16 | .304 | 3,334 |

It should be appreciated that these foams will cure at room temperature if sufficient time is allowed. It has been my experience that several days to a week are required in some instances to develop the optimum physical conditions in the foam. Therefore, in those cases it would be desirable to cure at elevated temperatures, that is, about 100–250° F. for a short time up to one or more hours to achieve the optimum physical conditions in a relatively short time.

It has been noted that the foam where exposed to the air has a tough skin and the density may vary from the inside to the outside of the foam. The nature of the skin may be varied by controlling the temperature of the mold in which the foaming recipe is poured. For instance, a relatively cold mold will tend to produce a thicker skin foam than one which is warm.

A method of forming a foam having a density of about 50 to 20 pounds per cubic foot and an improved impact resistance is to form a reaction mixture of a polyether glycol of about 700 to 1500 molecular weight selected from the group consisting of polypropylene ether glycol, polybutylene ether glycol and polypropylene ethylene ether glycol, an organic polyisocyanate having more than an average of 2 functional isocyanato groups and a foaming agent, foam and cure said reaction mixture.

The one-shot formulation technique prepolymer or semi-prepolymer methods is acceptable for preparing the polyether polyurethane foamable mixtures for use in this invention. In the semi-prepolymer process the total polyisocyanate called for in the formulation is premixed with less than all of the active hydrogen-containing compound of the final product, the reaction is allowed to take place between these two components. This resulting semi-prepolymer is then vigorously blended with the remaining formula ingredients plus the rest of the active hydrogen-containing compound to form a foamable mixture.

In the one-shot technique all the ingredients called for in the formula are initially vigorously mixed so that conversion of raw ingredients to a foamable mixture is accomplished in a single stage. With these techniques a homogeneous mixture of foamable ingredients is made. Dyes or pigments can be added during the processing of the raw materials. After vigorous mixing, the resulting mixture will be colored in a uniform manner in correspondence with these dyes, stains, pigments, or combination thereof. Therefore, the foamable mixtures may be the color of the formulary ingredients or that of a pigment or dye addition.

The foam forming reaction can be manipulated by conventional catalysts, and the cell size of the foam may be controlled by the addition of suitable surfactants such as conventional silicone oil or polyglycol-silicone polymer. Examples of reaction catalysts include n-methylmorpholine, tetramethylbutane - diamine, tri - ethylenediamine, stannous octoate, and dibutyltin dilaurate.

Foaming of the reactants is conventionally handled by either dissolving a blowing agent in the foamable mixture or by adding water to such a mixture. In water addition, carbon dioxide for foaming will be produced by either the reaction between an isocyanate and water to form an amine or it will be produced when water reacts with the urethane linkage of a semi-prepolymer mix. If the water addition method is not employed, suitable conventional halogenated propellants such as dichlorodifluoromethane, trichloromonofluoromethane, trifluoromonochloromethane and mixtures of same may be added to the mixture for foaming.

The impact test was performed on a finished face of the foam using a Gardner impact tester. A four pound weight with a 3/8" ball point was used. The diameter of the indentation and the percent of break around the cavity were recorded.

The polyaryl methane type polyisocyanates of the examples are available commercially having varying amounts of methane diphenylene isocyanate therein and this is normally achieved by varying the aniline to formaldehyde ratio from 4:2 to 4:3.5 although higher and lower ratios are used for special mixed isocyanates.

While certain representative embodiments and details have been shown for the purpose of illustrating the invention, it will be apparent to those skilled in this art that various changes and modifications may be made therein without departing from the spirit or scope of the invention.

What is claimed is:

1. A polyurethane foam having a tough skin and a density varying from inside out to the skin and a resulting density of 20 to about 50 pounds per cubic foot wherein the polyurethane foam is formed from a reaction mixture comprising 100 parts of a polyether glycol of about 700 to 1500 molecular weight, about 75 to 125 parts of an organic polyisocyanate having a functionality greater than 2, about 0 to 5 parts of water and 4 to 30 parts of a tri to tetrafunctional hydroxyl compound of less than 500 average molecular weight with the proviso that when the water is zero an auxiliary blowing agent is used.

2. The polyurethane foam of Claim 1 having a Gardner impact of at least 30 inch pounds.

3. The foam of Claim 1 wherein the foam is made by reacting a mixture comprising a polyether glycol having a molecular weight of about 700 to 1500 selected from the class consisting of polypropylene ether glycol, polypropylene ethylene ether glycol and polytetramethylene ether glycol, an organic polyisocyanate having an average NCO functionality of about 2.5 to 2.8, a monomeric polyol of less than 500 molecular weight and water, with the ratio of the NCO to OH groups being 0.95:1.0 to 1.15:1.0.

4. The foam of Claim 1 wherein the organic polyisocyanate is the phosgenation product of the acid rearranged product of the reaction of aniline and formaldehyde, the polyether glycol is polypropylene glycol and wood flour is present in 50 to 75 parts per 100 parts by weight of said polyether glycol.

5. A method of forming a tough foam having a density of about 50 to 20 pounds per cubic foot, said density varying from inside to outside the foam comprising forming a reaction mixture of a polyether glycol of about 700 to 1500 molecular weight selected from the group consisting of polypropylene ether glycol, polybutylene ether glycol and polypropylene ethylene ether glycol, an organic polyisocyanate having more than an average of 2 functional isocyanato groups, a monomeric polyol of less than 500 molecular weight and a foaming agent, foaming and curing said reaction mixture.

6. The method of Claim 1 wherein the reaction mixture contains a tri to tetra functional hydroxyl compound of less than 500 molecular weight.

7. The method of Claim 1 wherein the polyurethane reaction mixture is comprised of 100 parts of a polyether glycol of about 700 to 1500 molecular weight, about 75 to 125 parts of an organic polyisocyanate having a functionality greater than 2, 0 to 4 parts of water, 75 to 125 parts of nut-shell flour and 4 to 30 parts of a tri to tetra functional hydroxyl compound of less than 500 molecular weight with the proviso that when water is zero an auxiliary blowing agent is used.

References Cited

UNITED STATES PATENTS

| | | | |
|---|---|---|---|
| 3,728,288 | 4/1973 | Cobbs, Jr. et al. | 260—25 BD |
| 3,099,516 | 7/1963 | Hendrickson | 18—48 |
| 3,608,008 | 9/1971 | Soukup et al. | 264—45 |
| 3,655,597 | 4/1972 | Strassel | 260—2.5 |
| 2,608,536 | 8/1952 | Sterling | 260—2.5 |
| 2,740,743 | 4/1956 | Pace | 154—140 |
| 3,178,490 | 4/1965 | Petrino | 264—41 |
| 3,630,819 | 12/1971 | Conger | 264—45 |

FOREIGN PATENTS

| | | | |
|---|---|---|---|
| 1,124,827 | 8/1968 | Great Britain | 260—2.5 |
| 6509855 | 2/1966 | Netherlands | 260—2.5 |
| 1,499,902 | 11/1967 | France | 260—2.5 AZ |
| 1,499,903 | 11/1967 | France | 260—2.5 |
| 1,440,710 | 7/1966 | France | 260—2.5 AZ |
| 1,160,041 | 7/1969 | Great Britain | 260—2.5 AZ |

OTHER REFERENCES

Journal of Cellular Plastics, vol. 6, No. 4, July/August 1970, article by Grieve et al., pp. 164–170.

HERBERT S. COCKERAM, Primary Examiner

U.S. Cl. X.R.

260—2.5 AZ